United States Patent [19]
Thorne

[11] Patent Number: 6,046,565
[45] Date of Patent: Apr. 4, 2000

[54] ROBOTIC VEHICLE WITH DEDUCED RECKONING POSITIONING SYSTEM

[76] Inventor: Henry F. Thorne, 145 Hidden Valley Dr., Pittsburgh, Pa. 15237

[21] Appl. No.: 09/100,910

[22] Filed: Jun. 19, 1998

Related U.S. Application Data

[60] Provisional application No. 60/050,324, Jun. 20, 1997.
[51] Int. Cl.[7] ............................................. B64C 13/18
[52] U.S. Cl. .................................. 318/587; 901/1
[58] Field of Search ........................ 318/568.11, 568.12, 318/568.14, 580, 587, 52; 901/1; 180/197; 701/2, 26, 23, 41, 82, 210; D12/134, 135; D21/578

[56] References Cited

U.S. PATENT DOCUMENTS

| | | | |
|---|---|---|---|
| 3,047,039 | 7/1962 | Fishman | 152/308 |
| 3,994,402 | 11/1976 | Goldberger | 152/323 |
| 4,483,407 | 11/1984 | Iwamoto et al. | 180/9.5 |
| 4,746,977 | 5/1988 | White | 358/103 |
| 4,875,172 | 10/1989 | Kanayama | 364/513 |
| 5,073,749 | 12/1991 | Kanayama | 318/587 |
| 5,083,968 | 1/1992 | Hart | 446/431 |
| 5,175,480 | 12/1992 | McKeefery et al. | 318/587 |
| 5,276,618 | 1/1994 | Everett, Jr. | 364/424.02 |
| 5,324,948 | 6/1994 | Dudar et al. | 250/379 |
| 5,350,033 | 9/1994 | Kraft | 180/167 |
| 5,402,344 | 3/1995 | Reister et al. | 364/424.05 |
| 5,446,356 | 8/1995 | Kim | 318/587 |
| 5,461,292 | 10/1995 | Zondlo | 318/587 |
| 5,465,525 | 11/1995 | Mifune et al. | 43/132.1 |
| 5,515,934 | 5/1996 | Davis | 180/8.2 |
| 5,545,960 | 8/1996 | Ishikawa | 318/587 |
| 5,548,511 | 8/1996 | Bancroft | 364/424.02 |
| 5,559,696 | 9/1996 | Borenstein | 364/424.02 |

*Primary Examiner*—Robert E. Nappi
*Assistant Examiner*—Rina I. Duda
*Attorney, Agent, or Firm*—Webb Ziesenheim Logsdon Orkin & Hanson, P.C.

[57] ABSTRACT

A robotic vehicle includes two independent axially colinear wheels, wherein the wheels form the only contact with the floor when the robotic vehicle is at rest. A robot body is mounted between the wheels, and a ded-reckoning positioning system is mounted on the robot body. Each wheel includes a series of circumferentially spaced points forming the surface contact of said wheel with the floor. A graphical user interface is provided for manipulating the robotic vehicle. A robot attaching harness is on the robot body for coupling auxiliary equipment to the robotic vehicle. The ded-reckoning positioning system updates the relative position and orientation of the robotic vehicle through measurement of wheel rotation, and calculates an amount of slip for each wheel.

29 Claims, 5 Drawing Sheets

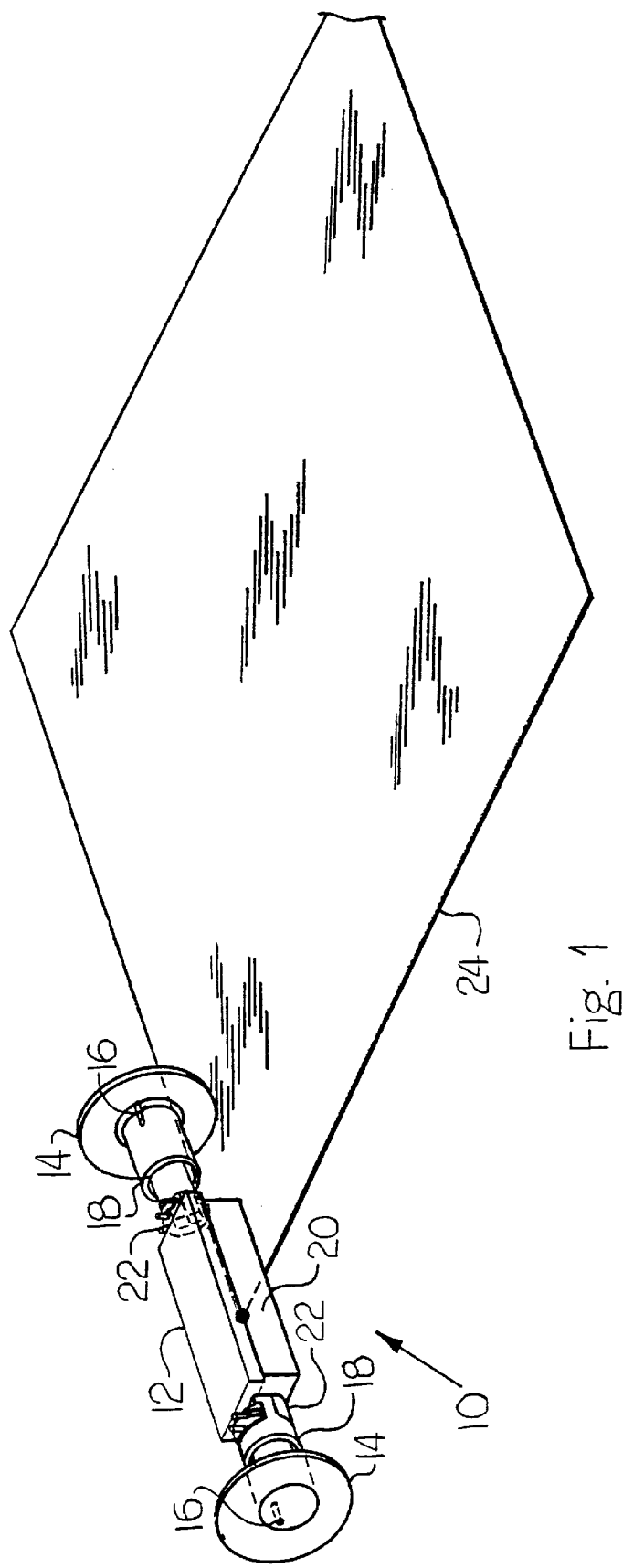

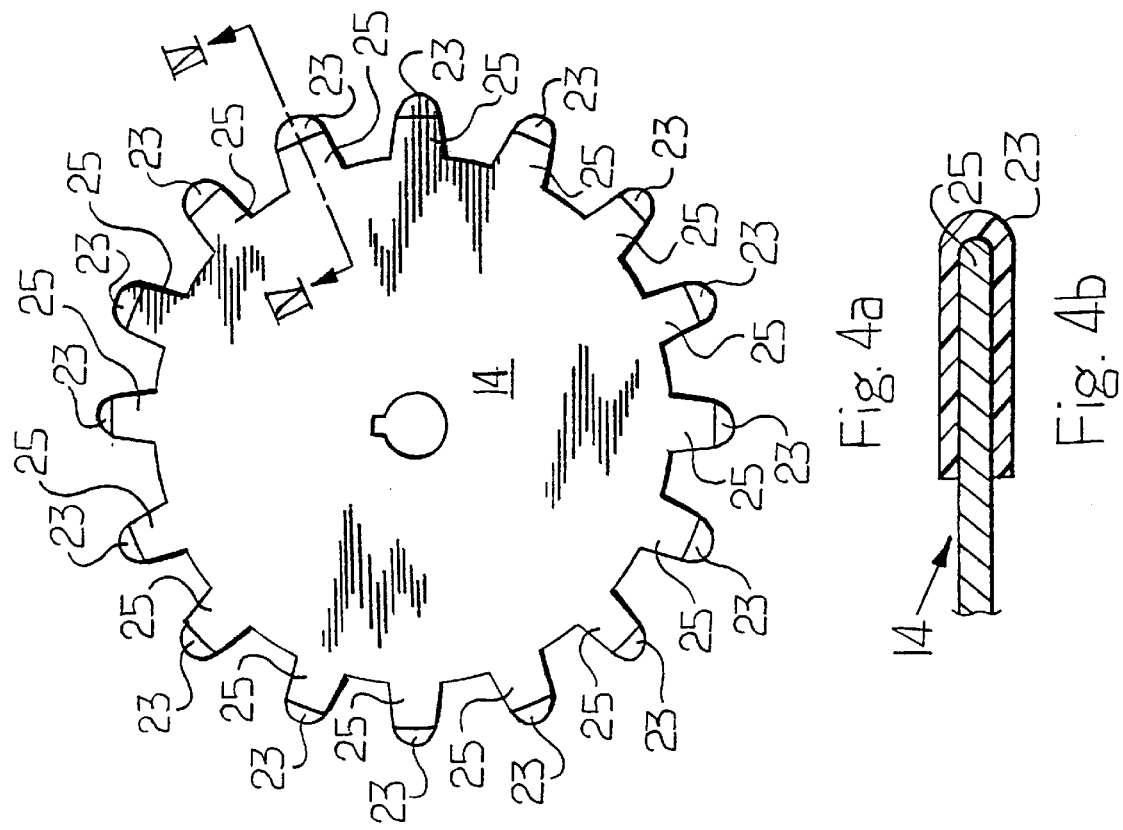
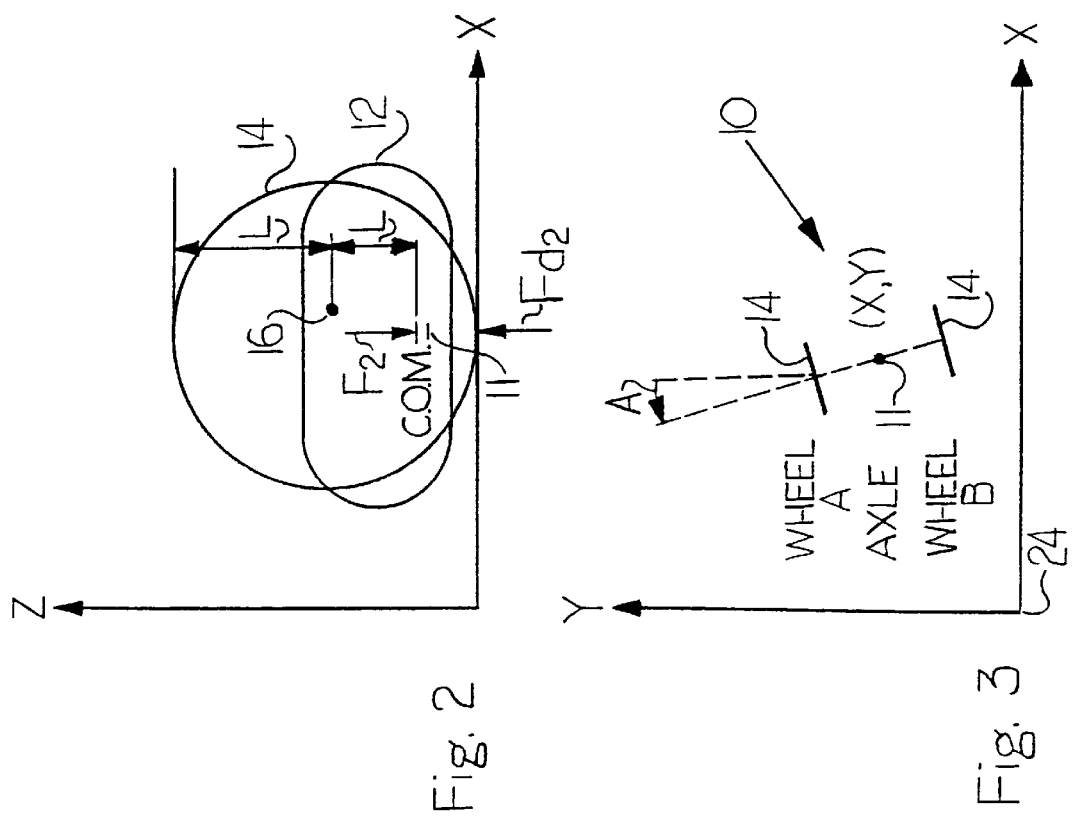

ROBOTIC VEHICLE WITH DEDUCED RECKONING POSITIONING SYSTEM

The present application claims the benefit of Provisional Patent Application Ser. No. 60/050,324 entitled "Suspended Carriage System for Improved Ded-Reckoning" filed on Jun. 20, 1997 which is incorporated herein by reference in its entirety.

BACKGROUND OF THE INVENTION

1. Field of the Invention

The present invention relates to a robotic vehicle with a vehicle tracking system, more specifically, the present invention relates to a suspended carriage system for improved ded-reckoning of robotic vehicles.

2. Background Information

Ded-reckoning, often called dead-reckoning in error, is a shortening of the term deduced reckoning. Deduced reckoning refers to a guidance or navigational system used to calculate the position of a moving object. Originally, sailors used to calculate their position by knowing where they started, and knowing the direction and the speed at which they were traveling. Deduced reckoning is the calculating of the current or updated position of an object based upon factors associated with movement of the object such as the direction of travel, the speed of travel and the time spent traveling in specific directions. The resulting calculated current position of the object is an approximation, and occasional corrections are made based upon known landmarks. Known landmarks could essentially be utilized to reset the starting position for subsequent updating by ded-reckoning techniques.

Robotic vehicles have utilized ded-reckoning systems to keep track of their location. For example, gantry style industrial robots use ded-reckoning techniques for calculating the location of the robotic carriage. Gantry style robots utilize a gear in a rack for movement of the robotic carriage. The rack is fixed and the gear causes the robotic carriage to travel along the length. The position of the robotic carriage is calculated by knowing how many revolutions the gear has turned and knowing the starting position of the robotic carriage. In a gantry style robot, the ded-reckoning positioning system can maintain an accuracy of up to 0.007 inches.

Ded-reckoning positioning systems can be utilized for tracking the Cartesian position of a wheeled vehicle as well. For any small incremental motion of each wheel, a new position and orientation can be calculated based upon the previous position and incremental rotation of each wheel. If the increments approach zero in length and the wheels maintain point contact with the road surface without slipping, the tracking error can be zero. However, the reality is that for any wheeled vehicle the contact with the floor is not a point but is a patch. Furthermore, slippage between the respective wheels and the flooring is inevitable. The slippage of the wheels is a result of the side forces generated on the wheels of the vehicle. Three elements cause side forces in wheels of a vehicle. First is acceleration; second is rolling resistance; and third is air friction. In certain applications, the acceleration and air friction can be minimized, leaving the rolling resistance as the primary contributor to side forces causing wheel slippage. The rolling resistance can be broken down into two components: rolling resistance of the powered wheel, and any other resistance caused by other contact between the vehicle and the surface. Rolling resistance of the powered wheel is always in the direction opposing the wheel and can be modeled mathematically. The larger, and more difficult to model, resistance associated with wheeled vehicles is that of a third or fourth point of contact between the vehicle and the floor which can exert forces in any direction on the powered wheel.

Robotic vehicles utilizing ded-reckoning as positioning systems have not satisfactorily eliminated wheel slippage, resulting in unacceptable error in the ded-reckoning positioning or tracking system. Consequently, the prior art robotic vehicles required frequent landmarks or methods of updating the position.

It is an object of the present invention to overcome the aforementioned drawbacks of the prior art. It is a further object of the present invention to provide a suspended carriage system for a robotic vehicle for improved ded-reckoning. A further object of the present invention is efficiently using ded-reckoning positioning systems for tracking robotic vehicle position. A further object of the present invention is to provide a simple control mechanism for manipulating a robotic vehicle position using a graphic interface. A further object of the present invention is to develop a robotic wheel design which minimizes error introduced into the robot positioning or tracking system. A further object of the present invention is to provide a ded-reckoning based robotic vehicle tracking system which compensates for wheel slippage. A further object of the present invention is to provide a simple calibration method for a robotic vehicle tracking system. A further object of the present invention is to provide a robot attaching harness for auxiliary equipment which minimizes error introduced into the robot positioning or tracking system.

SUMMARY OF THE INVENTION

The above objects are achieved by utilizing a suspended carriage system for a robotic vehicle according to the present invention resulting in an improved ded-reckoning positioning system for the robotic vehicle. Additionally, the robotic vehicle of the present invention utilizes a simple graphic user interface to control the position of the robotic vehicle. The suspended carriage system of the present invention includes at least two axial colinear wheels supporting the body of the robot therebetween with the center of mass of the robot body being vertically aligned and positioned below the axle line. The center of mass of the robot body is vertically aligned with the axle line to provide stability to the robotic vehicle.

Preferably each wheel of the carriage assembly is driven by an independent motor controllable by a central controller mounted on the robot body. An encoder mechanism is provided for each motor to track the amount or degree of rotation imparted by the respective motor to the respective wheel axle. The encoder mechanism is coupled to the central controller such that the central controller can update the robotic vehicle position and orientation using ded-reckoning techniques.

Each wheel of the suspended carriage of the present invention is preferably formed by a series of circumferentially spaced points or projections to minimize the surface contact of each wheel with the floor. The points may preferably be spaced from each other between 0.05 and 0.2 times the wheel diameter. Preferably, the points provide a gap between them which allows for carpet fiber to fill an area which is at least 0.25"×0.25". The outer 0.25" of the diameter of the wheel should be generally narrow, such as with a thickness of less than 0.375". The wheel should be relatively stiff such that there is less than 0.005 flexing of the tip per diameter under a 5 lb lateral load. Additionally, preferably each projection is formed from material having a relatively high coefficient of friction, such as a urethane rubber coating on the projections. The coefficient of friction of the wheel on a tile-type surface is preferably greater than 0.5.

Additionally, the present invention utilizes a graphic user interface for manipulating the robot position. The graphic user interface preferably includes a top view of the room with an illustration or icon of the respective position and orientation of the robotic vehicle in the room. The user clicks on the robot icon and then drags the mouse. The robotic vehicle will follow the corresponding direction the user drags until the user releases the mouse button. The present graphic user interface will utilize the vector created by the user to control the respective motors and move the robot in the desired direction. The graphic user interface of the present invention is intended to mimic roughly the action of a string pulling the robotic vehicle in same direction and orientation as the illustrated vector.

The present invention provides a ded-reckoning based robotic vehicle tracking system which compensates for wheel slippage. Specifically, the amount of slip at each wheel may be approximated or calculated as a function of wheel velocity, wheel acceleration and torque on the wheel. The torque on the wheel may be calculated as a function of current in the wheel motor, the voltage in the wheel motor and the velocity of the wheel. In one embodiment of the present invention the velocity, acceleration and voltage had minimal impact on the actual wheel slip amount such that the amount of slip could effectively be approximated as a linear function of the current on the wheel motor, such as: SLIP=A+B (CURRENT) where A and B are constants.

The present invention provides a robot attaching harness for auxiliary equipment which minimizes error introduced into the robot positioning or tracking system. Preferably the attaching harness is attached to the robot carriage at a midpoint between a pair of coaxial robot wheels. Preferably the harness is rotatable about a vertical axis which intersects the coaxial robot wheels at the midpoint between the robot wheels. Preferably, the ratio of the height of the harness joint above the floor to axel width will be as low as possible to better approximate the ideal planar situation.

These and other objects of the present invention will be clarified in the brief description of the preferred embodiments taken together with the attached figures.

BRIEF DESCRIPTION OF THE DRAWINGS

FIG. 1 schematically illustrates the suspended carriage system for the robotic vehicle according to the present invention;

FIG. 2 schematically illustrates a side view of the suspended carriage system of the robotic vehicle illustrated in FIG. 1;

FIG. 3 schematically illustrates a ded-reckoning positioning system for the robotic vehicle of the present invention;

FIG. 4a illustrates a side view of a wheel for the robotic vehicle illustrated in FIG. 1;

FIG. 4b is an enlarged cross section of a portion of the wheel illustrated in FIG. 4a taken along line IV—IV of FIG. 4a;

BRIEF DESCRIPTION OF THE PREFERRED EMBODIMENTS

Figure 6:
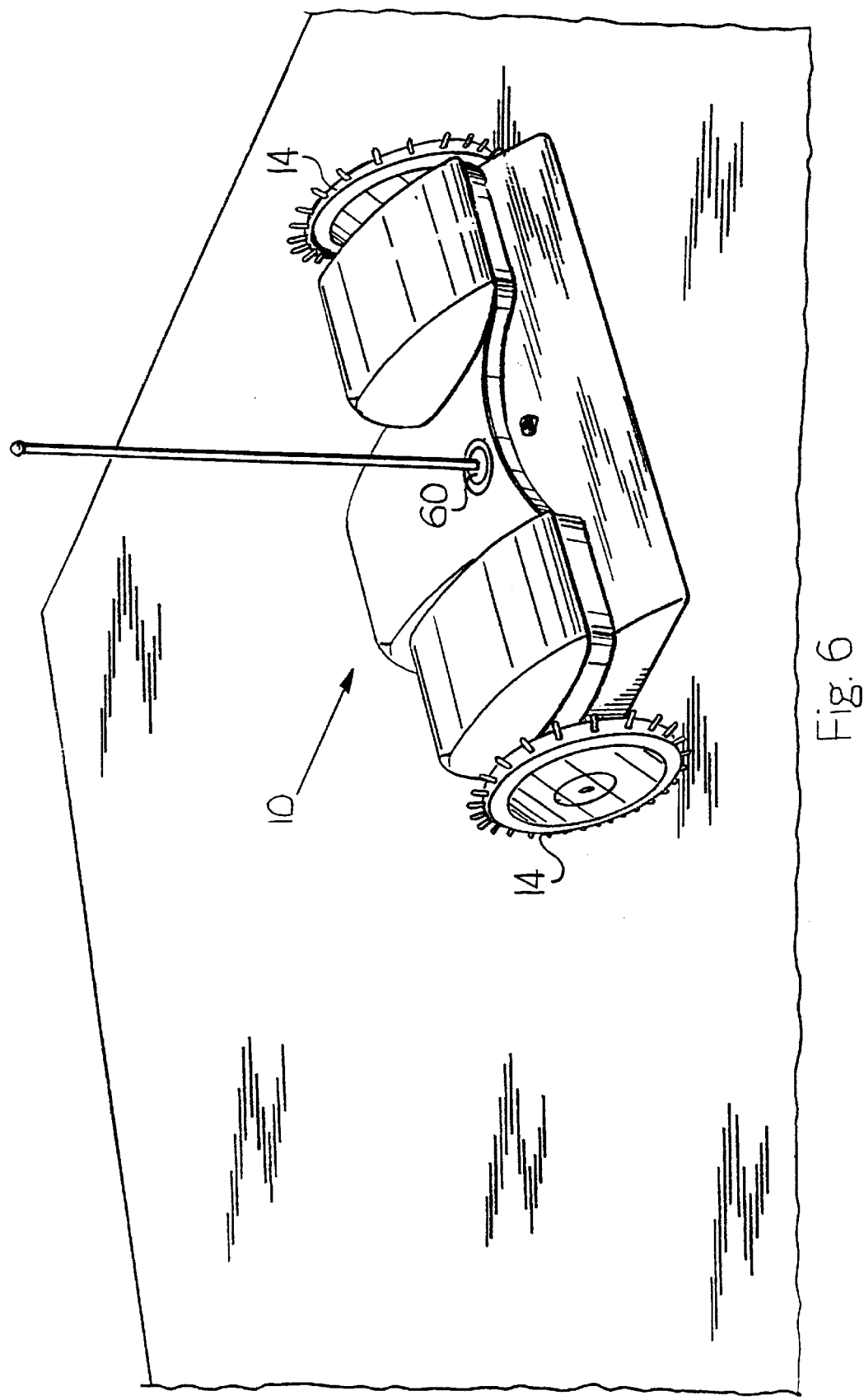
FIG. 6 is a perspective view of a suspended carriage system for the robotic vehicle according to the present invention.
Figure 7:
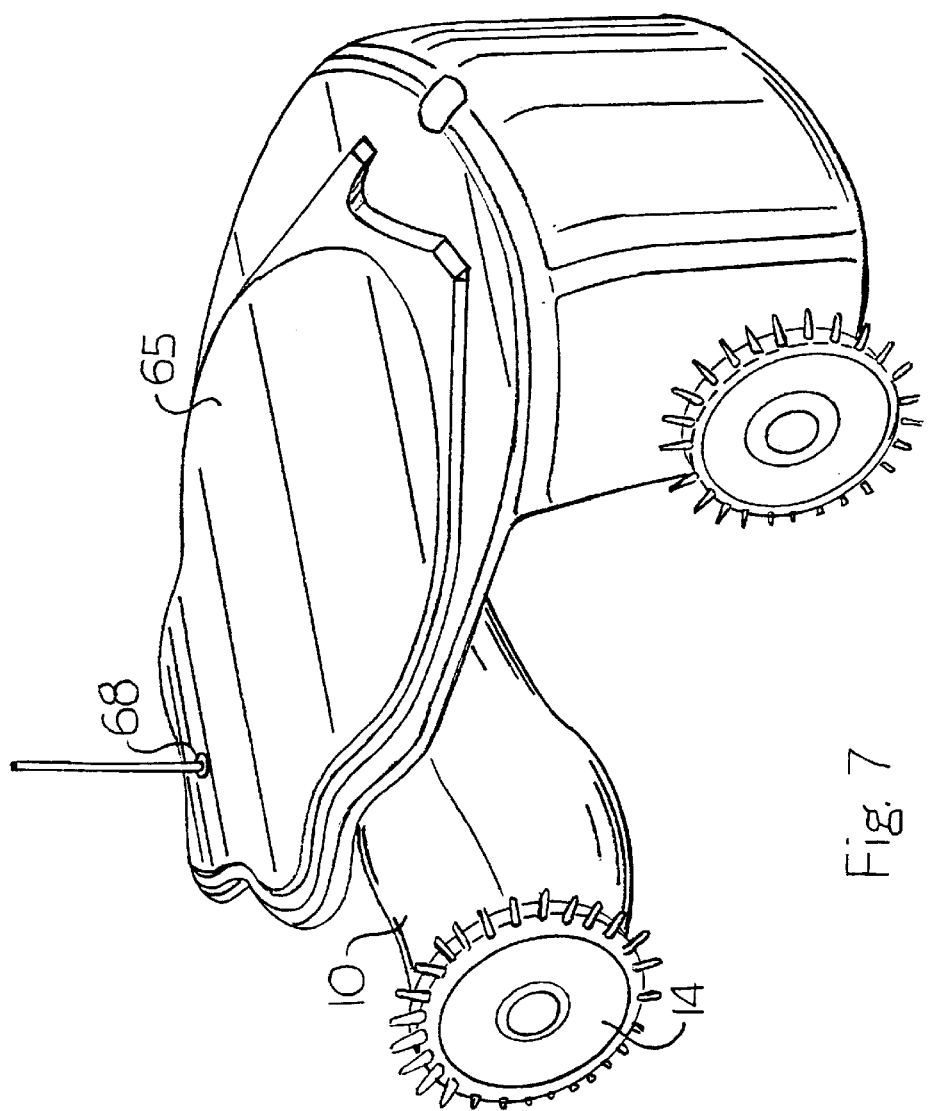
FIG. 7 is a perspective view of the robotic vehicle shown in FIG. 6 with an accessory attached thereto.

FIG. 1 schematically illustrates a robotic vehicle 10 according to the present invention, which is shown in perspective in FIGS. 6 and 7. The robotic vehicle 10 includes a main body portion 12 suspended between a pair of axially colinear wheels 14. Each wheel 14 includes an independent axle 16 moveable by an independent motor 18 supported on the body 12. Each motor 18 is operable by a central controller 20 supported on the main body 12 of the robotic vehicle 10. Additionally, an encoder 22 is associated with each motor 18 and is connected to the controller 20. Each encoder 22 calculates the degree of rotation imparted by the motor 18 on each axle 16. FIG. 1 additionally illustrates a reference plane 24 within which the controller 20 will maintain the relative position and orientation of the robotic vehicle 10 through ded-reckoning techniques as will be described hereinafter.

FIG. 2 schematically illustrates a side view of the robotic vehicle 10 which utilizes the two axially colinear wheels 14 and demonstrates the stability of the robotic vehicle 10 at rest. As shown in FIG. 2, when at rest the center of mass 11 of the body 12 is aligned vertically below the axle line of both axles 16 of both wheels 14. It will be evident that if the motors 18 rotate the axles 16 by a given angle, the result is a torque on the respective wheel 14. Friction at the floor will prevent the wheel 14 from rotating relative to the floor causing the floor to exert an equal and opposite counter-torque. This results in a linear force on the wheel 14 in the direction of travel. The linear force in the direction of travel is unbalanced, thereby resulting in an acceleration of the robotic vehicle 10 in the travel direction. It should be evident from a review of the construction shown in FIG. 2 that the body 12 can pivot about axle 16 and skid against the floor if too much torque is exerted on the wheels 14 before the acceleration of the robotic vehicle 10 is complete. The contact, however, between the robot body 12 and the floor should be minimized to avoid excessive side forces on the wheels 14 that may cause a corresponding slippage. Such slippage may result in error in the calculated position of the robotic vehicle 10.

The updating of the relative position and orientation of the robotic vehicle 10 in the reference plane 24 by ded-reckoning is better explained by a review of FIG. 3. As shown in FIG. 3, the robotic vehicle 10 starts, for example, at a position (X1, Y1, A1) where X and Y refer to the Cartesian position of the robot center 11 in the reference plane 24 and A is the angle of orientation of axles 16 of the robotic vehicle 10 with respect to the Y axis. In the reference plane 24, when the amount wheel A and wheel B travel is dWA and dWB and the axle length is L, then the next position that the robotic vehicle 10 reaches (X2, Y2, A2) can be calculated as follows, assuming that dWA and dWB are small with respect to L:

$A2 = A1 + ((dWB - dWA)/L)$ $X2 = X1 + ((dWA + dWB) * \cos(A)/2)$ $Y2 = Y1 + ((dWA + dWB) * \sin(A)/2)$ The encoders 22 are utilized to calculate dWA and dWB based upon the amount of rotation of each axle 16 by the respective motor 18. dWA and dWB can be calculated based upon the amount of rotation of the respective axle 16 and the diameter of the respective wheels 14.

The ded-reckoning based robotic vehicle tracking system in the robotic vehicle 10 compensates for wheel slippage. In operation the wheels 14 will have some amount of slippage that occurs between the wheel 14 and the floor. If this slippage amount could be quantified, the control of the robotic vehicle can account for this accordingly. The slippage may be accounted for by adjusting the calculated position of the robotic vehicle or by controlling the wheels 14 to have the robotic vehicle "catch up" to the calculated position. In other words, the wheels 14 could be turned some extra amount to accommodate the calculated slippage. Applicant believes the amount of slip at each wheel 14 may be accurately approximated or calculated as a function of wheel velocity, wheel acceleration and torque on the wheel. Additionally, the torque on the wheel may be calculated as a function of current in the wheel motor, the voltage in the wheel motor and the velocity of the wheel. Therefore, the slippage may be calculated according to the following:

SLIP=F (Velocity, Acceleration, Current and Voltage)

The specific relationship of these variables must be determined experimentally. For the sake of simplicity it is helpful if the relationship were linear, such as:

SLIP=A+B(Velocity)+C(Acceleration)+D(Current)+E(Voltage); where A, B, C, D and E are constants In one embodiment of the present invention the velocity, acceleration and voltage had minimal impact on the actual wheel slip amount such that the amount of slip could effectively be approximated as a linear function of the current on the wheel motor, such as:

SLIP=A+B(CURRENT); where A and B are constants

The slippage may be calculated about every 1/10 of an inch or so. The calculated slippage may be accounted for by adjusting the value dWA and dWB for the respective amount wheel A and wheel B travel, such as:

dWA=(calculated dWA)-SLIP and dWB=(calculated dWB)-SLIP

Another important feature of the present invention is to minimize the contact between the wheels 14 and the floor surface. In order to minimize this contact area, the wheels 14 are formed by a plurality of projections or points 25 as shown in FIGS. 4a and 4b so that the wheels 14 will approximate point contact with the floor. Additionally, the tips of the projections 25 of the wheels 14 are preferably coated with urethane 23 to provide a high friction material, preventing slipping of the wheels 14 relative to the floor. The coating may be applied by injection molding the urethane 23 over a hard plastic wheel or other manufacturing process known in the art. In designing a satisfactory wheel 14, several structural guidelines have been developed.

1) Each wheel 14 is formed by a series of circumferentially spaced points or projections 25 in a single plane to minimize the surface contact of each wheel 14 with the floor.
2) The points 25 should be spaced from each other between 0.05 and 0.2 times the wheel diameter, which allows sufficient space between adjacent points.
3) The points 25 have a gap between adjacent points 25 which defines at least a 0.25"×0.25" area, which allows for receipt of carpet fibers.
4) The outer 0.25" of the diameter of the wheel 14 should be generally narrow, such as with a thickness of less than 0.375", to minimize surface contact.
5) The wheel 14 should be relatively stiff such that there is less than 0.005 flexing of the point 25 per wheel diameter under a 5 lb lateral load.
6) Each point 25 of each wheel is formed from material having a relatively high coefficient of friction, wherein the coefficient of friction of the wheel 14 on a tile-type surface is preferable greater than 0.5.

The urethane coated wheel 14 satisfies these design criteria, thereby minimizing tracking error introduced into the ded-reckoning positioning system. A wheel made according to these design criteria would also be effective in any robotic vehicle where tracking errors are intended to be minimized.

Figure 5:
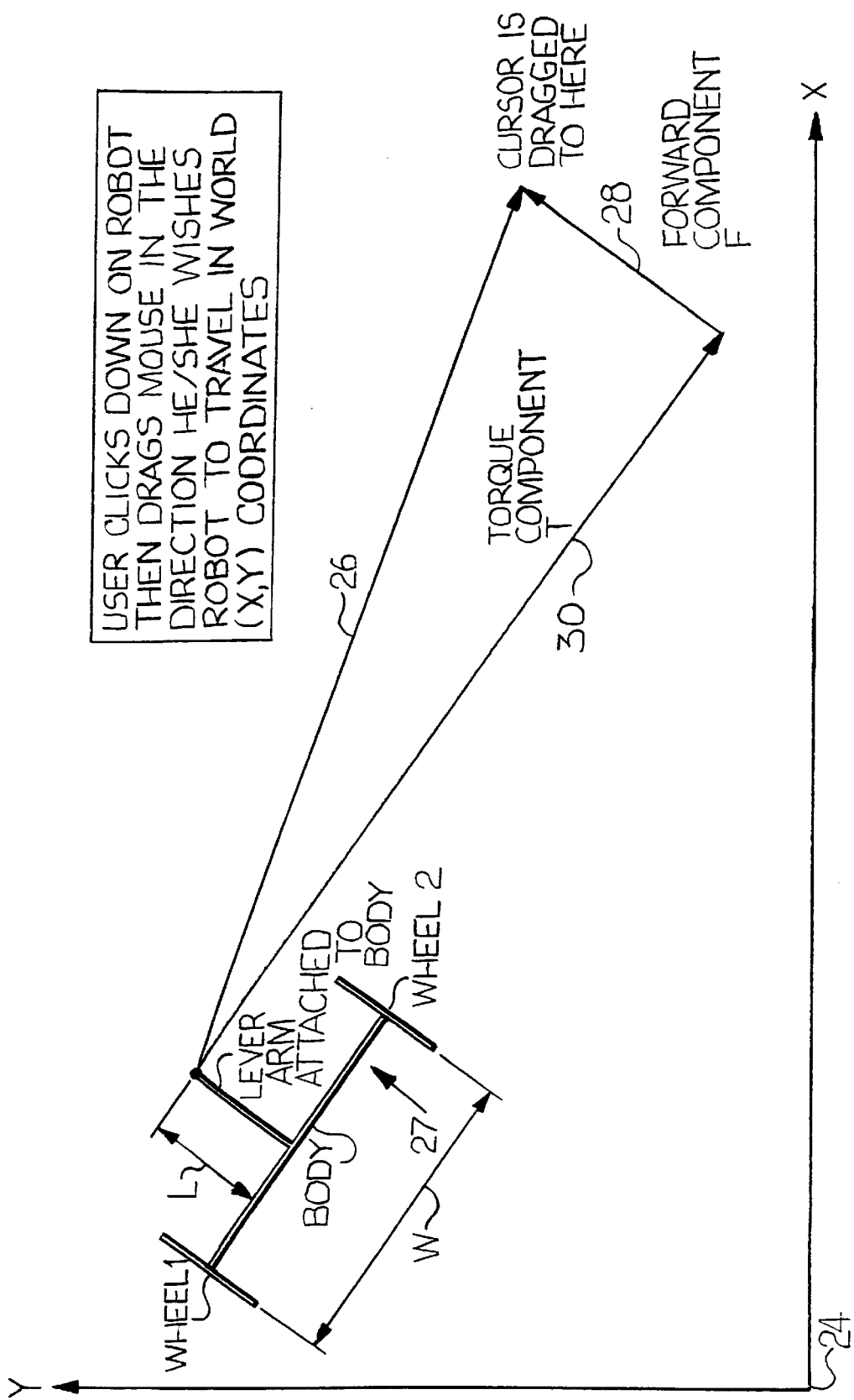
FIG. 5 schematically illustrates a graphic user interface for manipulating the robot illustrated in FIG. 1.

FIG. 5 illustrates a simple mechanism for manipulating the position of the robotic vehicle 10 with a graphic user interface. The intent of this graphic user interface is to give the user an easy way to manipulate the position of the robotic vehicle 10 in a room. The graphic user interface is illustrated schematically in FIG. 5 and shows a top view of the room with a representation or icon 27 of the robotic vehicle 10 provided in the room view relative to the reference plane 24. In operation, if the user clicks on the robot icon 27 then drags the mouse, the robotic vehicle 10 will follow in the direction the user drags in the graphic user interface until the user releases the mouse button (referred to as a mouse-up event). The vector 26 created by the user in the direction the user wishes the robotic vehicle 10 to move is "broken" into two component vectors 28 and 30 as illustrated in FIG. 5. One forward component vector 28 is in the direction of the wheels 14 and a torque component vector 30 is in a direction perpendicular to the direction of the wheels 14. The appropriate torques to be applied to each respective wheel 14 may then be calculated based upon the forward vector component 28 and the torque vector component 30. These components are applied by setting any of the following three components of wheel motion in proportion to the calculated vectors 28 and 30: current at the motor, torque at the motor, PWM at motor, velocity at motor, or acceleration at motor. For example:

The torque on wheel $1=K(F+(K2(L/W))T)$, and

The torque on wheel $2=K(F-(K2(L/W))T)$, where the K's are gain constants

Consequently, torque is only used as a representative example, current, power, acceleration or the like could also be utilized as the controlled value with similar results. As the robotic vehicle 10 moves and the cursor is moved on the screen, the equations are continually recomputed and the torque on the wheels are set accordingly. The motion of the robotic vehicle 10 is improved by applying a damping term to the equations as follows:

The torque on wheel $1=((\text{previous wheel 1 value})+K(F+(K2(L/W))T))/2$; and The torque on wheel $2=((\text{previous wheel 2 value})+K(F-(K2(L/W))T))/2$ In operation, the robotic vehicle 10 mimics the motion associated with pulling on the robotic vehicle 10 by a string extending along vector 26. The specific torques and motor controls can be forwarded to the controller 20 from the computer utilizing conventional radio transmitting equipment. Alternatively, a cord could be used directly coupling the computer to the robotic vehicle 10. However, a cord may interfere with the autonomy of the robotic vehicle 10 and can jeopardize the accuracy of the ded-reckoning positioning system described above. Consequently the cord should be lightweight and minimal in diameter to minimize these effects.

As shown in FIGS. 6 and 7, the robotic vehicle 10 is provided with a robot attaching harness 50 in the form of a nylon bearing surface or the like. The robot attaching harness is for coupling auxiliary equipment such as carriage or wagon 65 in a manner which minimizes error introduced into the robot positioning or tracking system. The attaching harness 50 is positioned on the robot carriage at a midpoint between a pair of colinear robot wheels. The harness 50 includes an attachment post 68 which is rotatable within the bearing surface in the vehicle body about a vertical axis which intersects the axis of the robot wheels 14 at the midpoint between the robot wheels 14. It is anticipated that a wagon or other accessory will be attached to the robotic vehicle 10 to improve the versatility of the device. The attachment harness 60 is positioned to minimize the adverse effects of the accessories on the ded-reckoning positioning system. Essentially this attachment system will effect each wheel 14 identically, and will not effect the accuracy of the orientation calculated by the ded-reckoning system. Other attachment constructions are possible, however, the important aspects are the position and the rotatability of the attachment system. Additionally, the ratio of the height of the harness joint above the floor to Axel width should be as low as possible to better approximate the ideal planar situation.

Figure 8:
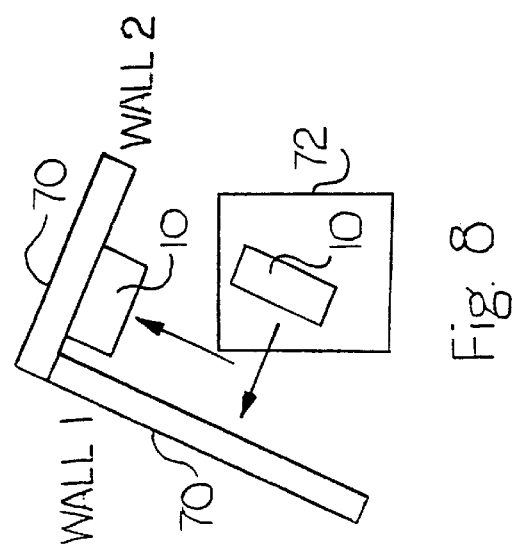
FIG. 8 schematically illustrates a calibration method for the robotic vehicle of the present invention.

The ded-reckoning positioning system for the robotic vehicle 10 includes calibration of an absolute position of the robotic vehicle relative to a fixed reference marker, such as walls 70, to eliminate accumulated error in a calculated position of the robotic vehicle 10. This process is shown schematically in FIG. 8. Preferably, the walls 70 are perpendicular to each other and aligned with the coordinate system for ease of calculation. If the reference walls 70 are not aligned with the coordinate system, a coordinate transformation can be performed as known to those skilled in the art. The key is that the position of the reference markers is known to the ded-reckoning system. In beginning the calibration process, the robot vehicle is at some unknown position close to the reference wall 70. Unknown position is a relative term in this context, for example due to the accumulated error the robotic vehicle will be positioned somewhere within the starting box 72 shown in FIG. 8. The robot will be advanced until it contacts the first reference wall 70. At this location, two of three positioning parameters are known, specifically the rotational orientation of the robotic vehicle 10 (A) and the Cartesian position of the robotic vehicle 10 relative to the wall (X or Y above depending on the particular coordinate system). Following this the robotic vehicle 10 is turned toward the second, perpendicular reference wall 70 and advanced until the robotic vehicle 10 contacts the reference wall 70. At this final position, the remaining positioning parameter is known (the remaining X or Y). This calibration eliminates the accumulated error in the ded-reckoning system. A single reference wall 70 may be used to eliminate the error in selected two parameters.

It will be apparent to those of ordinary skill in the art that various changes may be made to the present invention without departing from the spirit and scope thereof.

What is claimed is:
1. A robotic vehicle comprising:

two independent axially co-linear wheels, wherein said wheels form the only contact with the floor when said robotic vehicle is at rest;

a robot body mounted between said wheels wherein a center of mass of said robot body at rest is vertically aligned with said wheel axes; and a positioning system mounted on said robot body.

2. The robotic vehicle of claim 1 wherein each said wheel includes a series of circumferentially spaced points forming the surface contact of said wheel with the floor.

3. The robotic vehicle of claim 2 wherein said points of each said wheel are spaced from each other between 0.05 and 0.2 times a diameter of said wheel and wherein a thickness of each said point is less than about 0.375 inches.

4. The robotic vehicle of claim 2 wherein said points of each said wheel are coated with a material having a relatively high coefficient of friction.

5. The robotic vehicle of claim 1 further including a robot attaching harness on said robot body for coupling auxiliary equipment to said robotic vehicle, said attaching harness attached to said robot body at a midpoint between said wheels.

6. The robotic vehicle of claim 5 wherein said attaching harness is rotatable about a vertical axis which intersects the axis of said wheels at a midpoint between said wheels.

7. The robotic vehicle of claim 1 wherein said positioning system is a ded-reckoning positioning system which includes means for measuring wheel rotation and automatically updates the relative position and orientation of the robotic vehicle through measurement of wheel rotation.

8. The robotic vehicle of claim 7 wherein said means for measuring wheel rotation includes and least one encoder for each said wheel.

9. The robotic vehicle of claim 7 wherein said ded-reckoning positioning system updates the position and orientation of said robotic vehicle to a new position (X2, Y2, A2) from an original position (X1, Y1, A1) according to the following:

$$A2 = A1 + ((dWB - dWA)/L)$$

$$X2 = X1 + ((dWA + dWB) * COS(A)/2)$$

$$Y2 = Y1 + ((dWA + dWB) * SIN(A)/2);$$

wherein X and Y refer to a Cartesian position of said robotic vehicle in a reference plane, A is an angle of orientation of said robotic vehicle with respect to a Y axis, dWA and dWB are amounts of respective wheel travel, and L is an axle length between said pair of wheels.

10. The robotic vehicle of claim 7 wherein said ded-reckoning positioning system calculates an amount of slip for each said wheel.

11. The robotic vehicle of claim 10 further including an independent motor attached to said robot body, each said motor for driving one said wheel.

12. The robotic vehicle of claim 11 wherein said amount of slip for each said wheel is calculated as a function of velocity of said wheel, acceleration of said wheel, current applied to said wheel motor and voltage applied to said wheel motor.

13. The robotic vehicle of claim 11 wherein said amount of slip for each said wheel is calculated as a linear function of current applied to said wheel motor.

14. The robotic vehicle of claim 1 wherein said Positioning system is a ded-reckoning positioning system which includes means for calibrating an absolute position of said robotic vehicle relative to a fixed reference marker to eliminate accumulated error in a calculated position of said robotic vehicle.

15. The robotic vehicle of claim 14 wherein means for calibration is adapted to calibrate said position of said robotic vehicle relative to the fixed reference marker which includes two mutually perpendicular calibration surfaces.

16. The robotic vehicle of claim 1 further including a graphical user interface for manipulating said robotic vehicle.

17. The robotic vehicle of claim 16 wherein said graphical user interface includes a top view of a room containing said robotic vehicle and an icon of the respective position and orientation of said robotic vehicle within the room.

18. The robotic vehicle of claim 17 wherein a vector established from said icon in said graphical user interface is used to control torque applied to each respective wheel of said robotic vehicle.

19. A wheel for a robotic vehicle wherein said wheel includes a series of circumferentially spaced points forming the surface contact of said wheel with the floor, wherein the thickness of each said point is less than about 0.375 inches.

20. The wheel for a robotic vehicle of claim 19 wherein said points of each said wheel are coated with a material having a relatively high coefficient of friction, and said points of said wheel are spaced from each other between 0.05 and 0.2 times a diameter of said wheel.

21. A robotic vehicle comprising:
at least two independent axially colinear wheels;
a robot body mounted between said wheels, wherein a center of mass of said robot body is aligned vertically below an axle line of both axles of said two wheels; and
a robot attaching harness on said robot body for coupling auxiliary equipment to said robotic vehicle, said attaching harness attached to said robot body at a midpoint between said wheels.

22. The robotic vehicle of claim 21 wherein said attaching harness is rotatable about a vertical axis which intersects the axis of said wheels at a midpoint between said wheels.

23. The wheel for a robotic vehicle of claim 19 wherein a gap is positioned between adjacent points which defines an area at least 0.25 inches by 0.25 inches.

24. The wheel for a robotic vehicle of claim 19 wherein the outer 0.25 inches of the diameter of the wheel has a thickness of less than about 0.375 inches.

25. A ded-reckoning positioning system for a robotic vehicle, said ded-reckoning positioning system comprising a means for measuring robotic vehicle wheel rotation, wherein said ded-reckoning positioning system automatically updates the relative position and orientation of the robotic vehicle through measurement of wheel rotation, and wherein said ded-reckoning positioning system calculates an amount of slip for each wheel of the robotic vehicle, wherein said amount of slip for each wheel is calculated as a function of velocity of the wheel, acceleration of the wheel, current applied to the wheel motor and voltage applied to the wheel motor.

26. The ded-reckoning positioning system for a robotic vehicle of claim 25 wherein said amount of slip for each robotic wheel is calculated as a linear function of current applied to a wheel motor.

27. The ded-reckoning positioning system for a robotic vehicle of claim 25 wherein said ded-reckoning positioning system includes means for calibrating an absolute position of the robotic vehicle relative to a fixed reference marker to eliminate accumulated error in a calculated position of the robotic vehicle.

28. The ded-reckoning positioning system for a robotic vehicle of claim 27 wherein means for calibration is adapted to calibrate said position of the robotic vehicle relative to the fixed reference marker which includes two mutually perpendicular calibration surfaces.

29. A graphical user interface for manipulating a robotic vehicle, said graphical user interface comprising a top view of a room containing the robotic vehicle and an icon of the respective position and orientation of the robotic vehicle within the room, wherein a vector established from said icon in said graphical user interface is used to control each respective wheel of the robotic vehicle to move the robotic vehicle in the direction of said vector.

* * * * *